United States Patent Office 3,412,190
Patented Nov. 19, 1968

3,412,190
LOWERING BLOOD LIPIDS AND TREATING RHEUMATOID ARTHRITIS WITH DIPHOSPHOPYRIDINE NUCLEOTIDE
Paul Francis O'Hollaren, Seattle, Wash., assignor to Enzomedic Laboratories, Inc., Seattle, Wash., a corporation of Washington
No Drawing. Continuation-in-part of application Ser. No. 438,751, Mar. 10, 1965. This application Jan. 11, 1968, Ser. No. 697,023
9 Claims. (Cl. 424—177)

ABSTRACT OF THE DISCLOSURE

A composition containing diphosphopyridine nucleotide is used to lower elevated blood lipids and to treat rheumatoid arthritis when administered orally or parenterally.

---

This application is a continuation-in-part of my co-pending application U.S. Ser. No. 438,751 filed Mar. 10, 1965, now abandoned.

This invention is concerned with a method of treating elevated blood lipids, and alleviating the symptoms of rheumatoid arthritis by administering to a host so afflicted a composition containing diphosphopyridine nucleotide (hereinafter referred to as DPN).

The medical profession now recognizes that a warm blooded animal with a high level of blood fats is more susceptible to arterial disease and heart trouble than one with normal or low blood fat levels. It has been found that the blood contains various types of fat such as the total lipids, cholesterol esters, phospholipids, neutral fats, total fatty acids as well as the alpha and beta lipoproteins. Of these, the lipoproteins contribute most significantly to athero-sclerosis. When blood is centrifuged, two types of lipoproteins can be separated based on their flotation constants designated as Sf values. Each milligram percent of Sf 12–400 lipoprotein is 1.75 times as important for atherogenesis as is every milligram percent of Sf 0–12 lipoprotein. Once these values are determined, they can be converted into a single figure known as the atherogenic index.

Humans with high blood fat levels are susceptible to cerebral thrombosis and hemorrhage which causes strokes and paralysis. Once the coronary arteries of the heart become diseased, coronary thrombosis and miocardial infarction result. If the arteries of the extremities become involved, it can lead to Buerger's disease, Raynaud's disease or gangrene and amputation of the diseased extremity.

The only known treatment for elevated blood fats is a stringent low fat diet and exercise. Such a diet is extremely difficult to follow and does not always result in an appreciable reduction in the blood fats which discourages the patient and leads to discontinuance of the diet. Exercise is dangerous if some type of arterial weakness has already occurred and presents the danger of promulgating another vascular accident.

In addition to lowering blood lipids to prevent arterial disease, the present invention encompasses within its scope the treatment of rheumatoid arthritis. This type of arthritis is characterized by the inflammatory reaction which takes place in the involved tissues of the host suffering from the particular disease. This reaction varies considerably from one host to another but while present it evinces a typical cell response on the part of the tissues afflicted and often results in collagen matter being deposited at the site of the inflammation with varied degrees of tissue destruction and impaired function which can lead to permanent and total crippling of the host. Current methods of treating arthritis have been only moderately effective and the more potent medications such as cortisone have extremely undesirable side effects such as adrenal atrophy, duodenal and gastric ulcer formation, severe fluid retention and electrolyte imbalance.

One object of the present invention is to provide a method of lowering blood lipids by administering to a living host so afflicted, a composition containing DPN. Another object is to provide a method of treating a host already suffering from arterial disease which is simple to perform but effective in lowering lipids without a vigorous diet or the danger of strenuous exercise. A further object of the invention is to provide a method of treating rheumatoid arthritis by administering to a host afflicted therewith a composition containing DPN which is very effective in reducing the inflammatory reaction and preventing the progress of the disease without the dangerous side effects of the present methods of treatment.

This invention is predicated upon the discovery that DPN is effective in lowering elevated blood lipids as well as alleviating the inflammation associated with rheumatoid arthritis when administered to a warm blooded animal so afflicted in combination with any non-toxic, liquid or solid pharmaceutical carrier. The DPN can be given orally, rectally, intramuscularly or intravenously. DPN is a co-enzyme which can be isolated from fresh baker's yeast and is commercially available as white powder freely soluble in water. In one method of operation, the DPN is dissolved in sterile, aqueous, isotonic, saline solution and administered either intramuscularly or intravenously to substantially reduce abnormally high levels of blood fat or to reduce the inflammation and pain of rheumatoid arthritis. It is to be understood that the conditions treated can occur either separately or concurrently.

In preparing compositions suitable for use in the method of the present invention, DPN is mixed with liquid carriers such as water, vegetable oils, benzyl alcohol, propylene glycol and the like in the form of a solution, suspension or emulsion. If desired, other substances such as preserving agents, stabilizing agents, wetting or emulsifying agents, buffers or salts for varying the osmotic pressure can be added. The DPN can also be formulated with solid carriers such as milk sugar, acacia, corn starch, talc, stearic acid, lactose or magnesium stearate and compressed into tablets for oral administration. Likewise, DPN per se or in combination with any of the liquid or solid carriers hereinbefore enumerated can be sealed in a gelatin capsule for rectal use.

The effective dosages of DPN employed can vary generally from about one-half a gram to five grams daily in both lowering blood lipids or treating the inflammation of rheumatoid arthritis. Orally or rectally one should administer from 1 to 3 grams of DPN daily in treating both conditions. Intramuscularly, an effective amount of from 100 to 200 milligrams of DPN in 3 ml. of a buffered aqueous solution is injected two or three times daily and this regimen can be gradually diminished depending upon the effect on the patient. Intravenously, it is preferable to employ a solution of 500 to 1000 milligrams of DPN in 300 ml. of normal aqueous saline daily until noticeable improvement in the condition treated is achieved. Enteric-coated tablets containing about 500 mg. of DPN can be given orally several times a day until a dosage of from 1 to 3 grams has been administered. Since DPN is virtually non-toxic, there is no danger in overdosage. It is to be understood that the same dosage regimen as set forth above is to be employed for lowering blood lipids and treating rheumatoid arthritis irrespective of the route of administration.

I claim:
1. A method of lowering blood lipids in a human host afflicted with elevated blood lipids which comprises ad- ministering to such host an effective amount of a composition containing diphosphopyridine nucleotide.

2. A method as claimed in claim 1 in which the diphosphopyridine nucleotide is admixed with a pharmaceutically acceptable carrier.

3. A method as claimed in claim 1 in which the composition is administered intramuscularly.

4. A method as claimed in claim 1 in which the composition is administered intravenously.

5. A method as claimed in claim 1 in which the composition is administered orally.

6. A method of treating rheumatoid arthritis which comprises administering to a human host so afflicted an effective amount of a composition containing diphosphopyridine nucleotide.

7. A method as claimed in claim 6 in which the composition is administered intramuscularly.

8. A method as claimed in claim 6 in which the composition is administered intravenously.

9. A method as claimed in claim 6 in which the composition is administered orally in dosage form.

References Cited

UNITED STATES PATENTS 2,965,542  12/1960  Castaigne _____ 167—65

ALBERT T. MEYERS, *Primary Examiner.*

V. C. CLARKE, *Assistant Examiner.*